United States Patent
Kono et al.

[11] Patent Number: 5,986,428
[45] Date of Patent: *Nov. 16, 1999

[54] METHOD FOR CONTROLLING ACCELERATION/DECELERATION OF AN INDUCTION MOTOR AND A CONTROL DEVICE

[75] Inventors: Shinichi Kono; Junichi Tezuka, both of Yamanashi, Japan

[73] Assignee: Fanuc Ltd., Yamanashi, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/826,044

[22] Filed: Mar. 28, 1997

Related U.S. Application Data

[63] Continuation of application No. 08/398,538, Mar. 6, 1995, abandoned.

[30] Foreign Application Priority Data

Mar. 24, 1994 [JP] Japan .................................. 6-076386

[51] Int. Cl.$^6$ ...................................... H02P 5/28
[52] U.S. Cl. ............................. 318/807; 318/802
[58] Field of Search ..................... 318/798–812

[56] References Cited

U.S. PATENT DOCUMENTS

| | | | |
|---|---|---|---|
| 4,259,628 | 3/1981 | Iwakane et al. | 318/799 |
| 4,749,932 | 6/1988 | Yonemoto | 318/759 |
| 4,767,976 | 8/1988 | Mutoh et al. | 318/808 |
| 4,843,296 | 6/1989 | Tanaka | 318/800 |
| 5,032,771 | 7/1991 | Kerkman et al. | 318/52 |
| 5,136,228 | 8/1992 | Yamada et al. | 318/808 |
| 5,365,158 | 11/1994 | Tanaka et al. | 318/806 |
| 5,475,293 | 12/1995 | Sakai et al. | 318/802 |

OTHER PUBLICATIONS

Leonhard, W. "Control of Electrical Drives" Berlin Heidelberg New York 1985 p. 46, Jun. 1985.

Primary Examiner—David Martin
Attorney, Agent, or Firm—Staas & Halsey

[57] ABSTRACT

In the primary frequency control of an induction motor which controls the velocity by changing the supply frequency of the induction motor, the torque component current value is determined from the current value on the primary side of the induction motor, and the excitation frequency command corresponding to the torque component current value is determined by changing the velocity command value by the torque component current value. Based on the excitation frequency command, the voltage command is formed and supplied to the primary side of the induction motor, to drive the induction motor. The acceleration and deceleration of the induction motor is thus performed in which the adjustment of the excitation frequency depends on the change of the load inertia.

12 Claims, 9 Drawing Sheets

(1) WHEN $\omega r - \omega rc > 0$

EXCITATION FREQUENCY $\omega rc$ / VELOCITY COMMAND $\omega r$ $\omega r - \omega rc$ OUTPUT OF CLAMPING CIRCUIT $\Delta \omega r$ / CLAMPING VALUE VELOCITY CHANGE WIDTH $\Delta \omega rq$ / RESTRICTION BY Iq OUTPUT OF INTEGRATION SECTION $\omega rc$ / VELOCITY COMMAND $\omega r$ (A) WHEN Iq IS SMALL      (B) WHEN Iq IS LARGE (2) WHEN ωr - ωrc < 0

EXCITATION FREQUENCY ωrc

VELOCITY COMMAND ωr

[ωr - ωrc]

OUTPUT OF CLAMPING CIRCUIT Δωr

CLAMPING VALUE

VELOCITY CHANGE WIDTH Δωrq

RESTRICTION BY Iq

OUTPUT OF INTEGRATION SECTION ωrc

VELOCITY COMMAND ωr (A) WHEN Iq IS SMALL (B) WHEN Iq IS LARGE

R1: PRIMARY RESISTANCE
L1: PRIMARY INDUCTANCE
LL1: PRIMARY LEAKAGE INDUCTANCE
M: MUTUAL INDUCTANCE

R2: SECONDARY RESISTANCE
L2: SECONDARY INDUCTANCE
LL2: SECONDARY LEAKAGE INDUCTANCE
S: SLIP $M' = M^2/L2$
$R2' = (M/L2)^2 \cdot R2$     $LL2' = M \cdot LL2/L2$

METHOD FOR CONTROLLING ACCELERATION/DECELERATION OF AN INDUCTION MOTOR AND A CONTROL DEVICE

This application is a continuation of application Ser. No. 08/398,538, filed Mar. 6, 1995, now abandoned.

BACKGROUND OF THE INVENTION

1. Field of the Invention

The present invention relates to a method for controlling acceleration/deceleration of an induction motor and a control device, and more particularly, the present invention relates to a control process and a control device for automatically controlling the excitation frequency of an inverter in response to the load.

2. Description of the Related Art

As a method to control acceleration/deceleration of an induction motor, there can be mentioned an open loop control which controls acceleration/deceleration without requiring speed detection of the motor. As the open loop control, a primary frequency control is known. The primary frequency control is a method to change the synchronous speed and control the rotation speed by changing a frequency supplied to the induction motor. In this case, if the frequency is changed with the supplied voltage being constant, the internal magnetic flux changes in inverse proportion to the frequency. Therefore, in the low frequency region, the magnetic flux saturation is caused, on the other hand, in the high frequency region, such a phenomenon that the magnetic flux becomes short is caused. In order to avoid such a phenomenon, the supplied voltage is also changed so as to be approximately proportional to the frequency. Generally, the control of the frequency is carried out using an inverter. For example, the alternating voltage for the commercial power supply is converted to the direct voltage by a converter, which is converted to variable voltage and variable frequency set up with the voltage/frequency command by a general-use inverter.

In general, an inverter is based on a linear acceleration/deceleration. Therefore, in the case where the acceleration and deceleration are carried out by the inverter, if the excitation frequency is changed stepwise, the effective torque is not output, thereby the acceleration and deceleration are not carried out smoothly. For example, as shown in FIG. 11 showing the accelerated and decelerated time of the inverter, at the time of acceleration, the acceleration time is determined by a condition that (torque of the motor–load torque) becomes minimum, and other conditions such as the set rotation number of the motor, load inertia and the like. On the other hand, at the time of deceleration, the deceleration time is determined by the conditions such as (torque of the motor+load torque), the set rotation number of the motor, load inertia and the like. Therefore, considering the time required for the above-mentioned acceleration/deceleration, the excitation frequency is changed by a certain time constant. The time constant is generally preset corresponding to the load inertia and the like, and the excitation frequency is changed in response to the set time constant.

Therefore, in the conventional method to control the rotation speed of the induction motor, the excitation frequency is changed according to the set time constant. However, in this conventional method for controlling the rotation speed, when the load inertia and the like become large, even if the excitation frequency is changed with the preset time constant, the time constant cannot follow the excitation frequency. In such cases, there is a problem in that a proper time constant should be reset corresponding to the magnitude of the load inertia.

SUMMARY OF THE INVENTION

The present invention provides a method for controlling the acceleration/deceleration and a control device of an induction motor in which the above-mentioned conventional problems can be solved and the adjustment of the excitation frequency is possible in response to the change of the load inertia.

In the primary frequency control of an induction motor which controls the velocity by changing the supply frequency of the induction motor, the present invention is to determine the torque component current value from the current value on the primary side of the induction motor to estimate the load current value of the induction motor, and to determine the excitation frequency command in response to the load by changing the velocity command value by the torque component current value.

And the excitation frequency command of the present invention sets the voltage command by the excitation current command determined by using the excitation frequency command and the torque component current value, and the acceleration/deceleration control of the induction motor is carried out by supplying the voltage command to the primary side of the induction motor.

Furthermore, the torque component current value in the present invention can be determined from the q-axis component obtained by the d-q transformation of at least two phase excitation currents among the three phase excitation currents supplied to the primary side of the induction motor. Furthermore, the excitation frequency command in the present invention can be determined by determining the velocity change width against the torque component current value from the torque current component value-velocity change width characteristic of the induction motor according to the velocity command value, and by integrating the velocity variation width thereof. Furthermore, the excitation frequency command of the present invention can carry out the correction to the velocity change of the induction motor by adding the frequency determined from the torque component current value.

Furthermore, in the acceleration/deceleration control device of an induction motor which carries out the primary frequency control of an induction motor which controls the velocity by changing the supply frequency of the induction motor, the present invention is composed of a torque component current calculation section which estimates the load current value of the induction motor which determines the torque component current value from the current value on the primary side of the induction motor, and an acceleration/deceleration control section which outputs the excitation frequency command in response to the load by changing the velocity command value according to said torque component current value.

And, the acceleration/deceleration control section can be connected to an excitation current calculation section which outputs the excitation current command according to the excitation frequency command, and a voltage command calculation section which supplies the voltage command to the primary side, which is determined by the excitation current command, the excitation frequency command and the torque component current value.

Furthermore, the torque component current calculation section of the present invention carries out the calculation of the d-q transformation by inputting at least two phase excitation currents among the three phase excitation currents supplied to the primary side of the induction motor.

Furthermore, the acceleration/deceleration control section of the present invention outputs the excitation frequency command by determining the velocity change width against the torque component current value using the torque current component value-velocity change width characteristic of the induction motor, and by integrating the velocity change width thereof.

The maximum value of the velocity change width of the present invention may be a value determined in response to the velocity command value, or may be a preset value.

Furthermore, in the acceleration/deceleration control device of the induction motor of the present invention, a slip frequency calculation section may be added which carries out a correction by the velocity change of the induction motor, by determining a slip frequency from the torque component current value to be added to said excitation frequency command.

According to the present invention, in the primary frequency control of the induction motor which controls the velocity by changing the supply frequency of the induction motor, the load current value of the induction motor is estimated by determining the torque component current value from the current value on the primary side of the induction motor to determine the excitation frequency command in response to the load by changing the velocity command value by the torque component current value, and based on the excitation frequency command, a voltage command is formed and supplied to the primary side of the induction motor to drive the induction motor, thereby the acceleration/deceleration control of the induction motor is carried out, in which the excitation frequency can be adjusted in response to the change in the load inertia.

The torque component current calculation section of the induction motor of the present invention makes the d-q transformation at least the two phase excitation currents among the three phase excitation currents supplied to the primary side of the induction motor of the induction motor to determine the torque component current value from the q-axis component obtained by said transformation. And, this torque component current value is input to the acceleration/deceleration control section. The acceleration/deceleration control section determines the velocity change width against the torque component current value from said torque component current calculation section by using the torque current component value-velocity change width characteristic of the induction motor in response to the input velocity command value, and determines the excitation frequency command by integrating the velocity change width.

Furthermore, the voltage command calculation section forms a voltage command value to the motor using the excitation frequency command, the excitation current command, the torque component current value and the exciting phase. In this formation of the voltage command value, a coordinate transformation is carried out for transforming the voltage command of the d-q coordinate systems which are the two-phase orthogonal coordinate systems to the three-phase voltage commands to form the three-phase voltage command to the motor. The induction motor is to be driven according to this voltage command. Correction by the velocity change of the induction motor can be carried out by making the torque component current value contribute to the voltage command.

Furthermore, A slip frequency is determined by using the torque component current value, which is added to the excitation frequency command to make a correction by the velocity change of the induction motor.

DETAILED DESCRIPTION OF THE PREFERRED EMBODIMENTS

EXAMPLE 1 OF THE PRESENT INVENTION

First, the structure of Example 1 in the acceleration/deceleration control of the induction motor of the present invention will be described with reference to the block diagram of FIG. 1.

Figure 1:
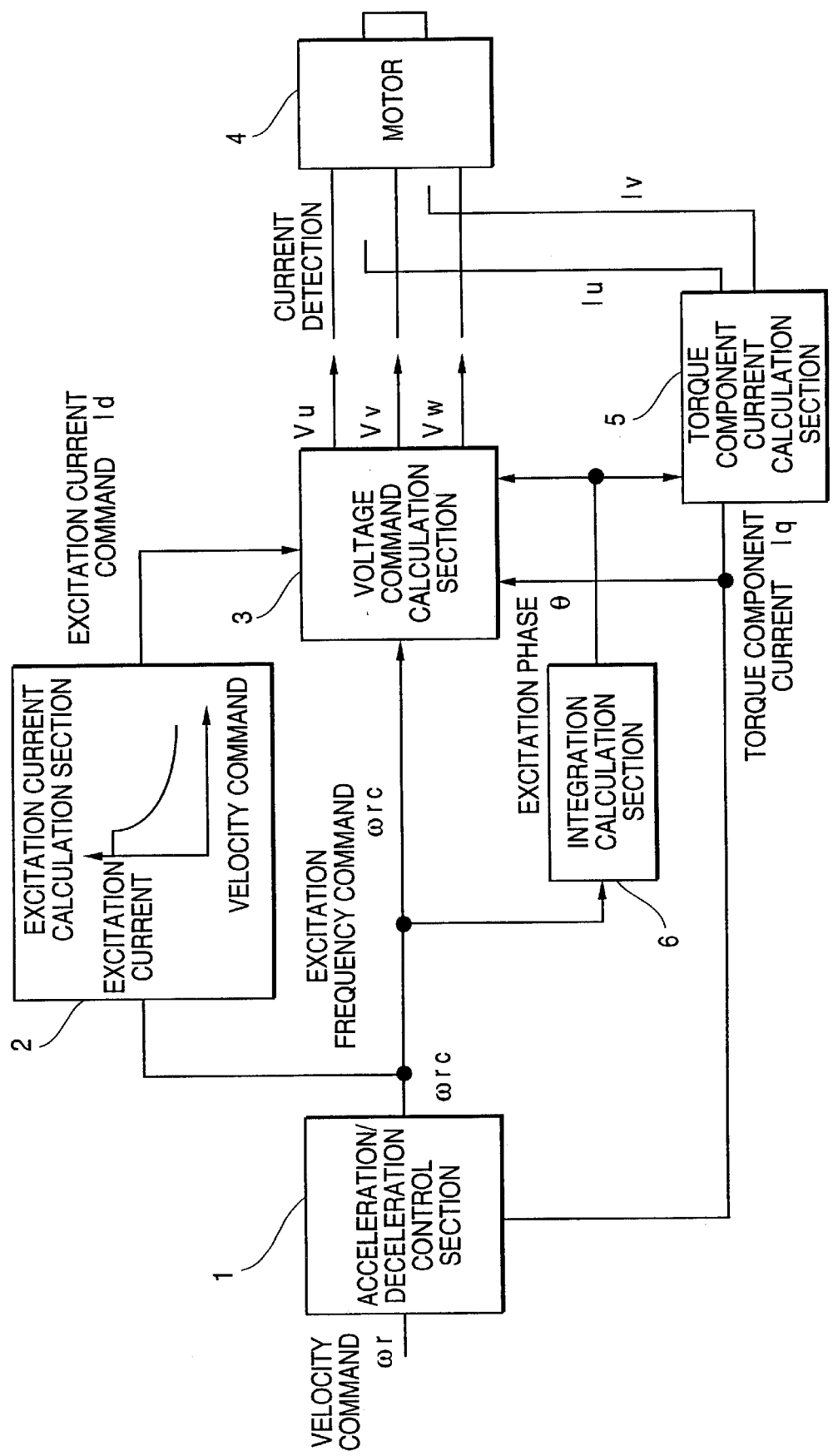
FIG. 1 is a block diagram illustrating the structure of Example 1 in the acceleration/deceleration control of the induction motor of the present invention.

Referring to FIG. 1, 1 is an acceleration/deceleration control section which transforms the input velocity command or to the excitation frequency command ωrc having a magnitude corresponding to the magnitude of the load current of the induction motor, 2 is an excitation current calculation section which inputs the excitation frequency command ωrc of the acceleration/deceleration control section 1 and outputs the excitation current command Id, 3 is a voltage command calculation section which inputs the excitation frequency command ωrc, the excitation current command Id from the excitation current calculation section and the torque component current calculation value Iq to determine the three phase voltages Vu, Vv and Vw to be supplied to the primary side of the motor 4, 4 is a motor driven by the voltage command from the voltage command calculation section 3, 5 is a torque component current calculation section which determines the torque component current value Iq by using at least two phase primary currents among the three-phase currents on the primary side of the motor 4, and 6 is an integration calculation section which determines the excitation phase θ by integrating the excitation frequency command ωrc.

The acceleration/deceleration control of the induction motor of the present invention determines the torque component current value from the current value on the primary side of the induction motor, instead of directly determining the load current of the induction motor, and estimates the load current of the induction motor by said torque component current value, and the voltage change of the motor is corrected using this torque component current value and the excitation frequency control is carried out in response to the load. Therefore, the present invention comprises, as the structure for carrying out this excitation frequency control, an acceleration/deceleration control section 1 for controlling the velocity command $\omega r$ by inputting the torque component current value Iq, and a torque component current calculation section 5 for determining this torque component current value Iq.

The acceleration/deceleration control section 1, the torque component current calculation section 5 and the voltage command calculation section 3 which are the component for carrying out the excitation frequency control of the present invention will now be described in detail.

(The acceleration/deceleration control section)

Figure 2:
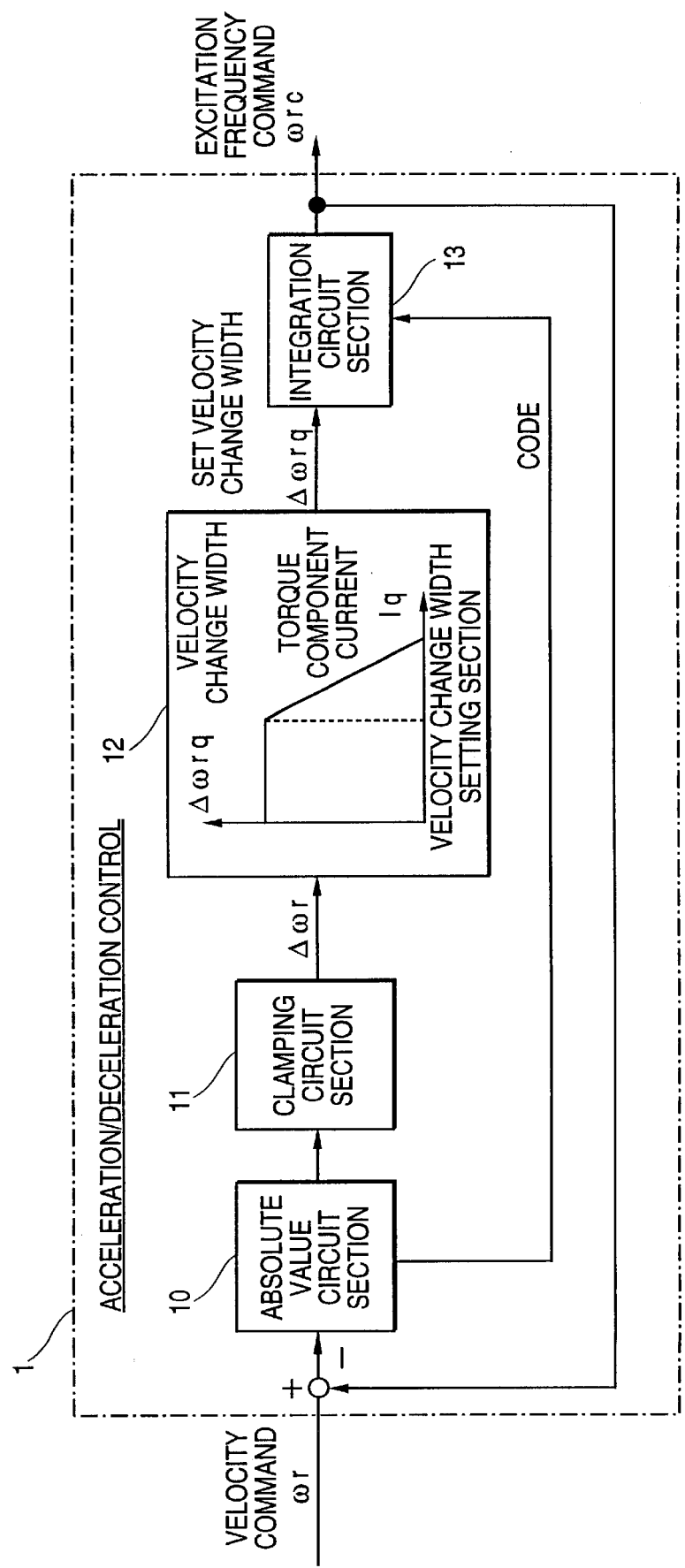
FIG. 2 is a block diagram illustrating the structure of the acceleration/deceleration control section of the present invention.
Figure 3:
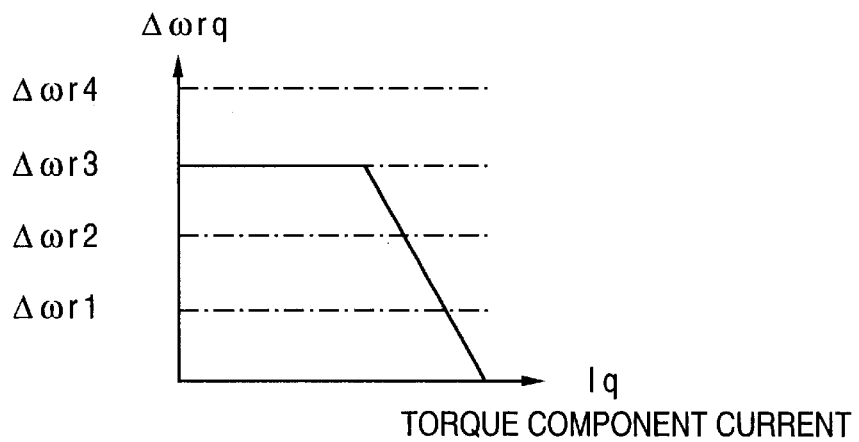
FIG. 3 is a graph showing the relation of the velocity change width ωrq against the torque component current value Iq and also showing the relation of the velocity change width against the velocity command of the present invention.

First, the acceleration/deceleration control section 1 will be described with reference to the block structural diagram of the acceleration/deceleration control section of the present invention of FIG. 2, the graph of FIG. 3 showing the velocity change width $\omega rq$ against the torque component current value Iq and the view of FIG. 4 showing the set velocity change width $\Delta\omega rq$ against the torque component current value Iq of the present invention.

In the block structural diagram of FIG. 2, acceleration/deceleration control section 1 has a structure that an absolute value circuit section 10, a clamping circuit section 11, a velocity change width setting section 12, and an integration circuit section 13 are connected in series, wherein the velocity command $\omega r$ as an input signal to the acceleration/deceleration control section 1 is input to the absolute value circuit section 10, and the excitation frequency command $\omega rc$ which is an output signal of the acceleration/deceleration control section 1 is output from the integration circuit section 13.

To the input stage of the absolute value circuit section 10 which is one element in said component, the difference between the velocity command $\omega r$ and the excitation frequency command $\omega rc$ (=($\omega r - \omega rc$)) is input. The absolute value circuit section 10 outputs the absolute value which shows the magnitude of this difference and a code showing which is larger between the velocity command or and the excitation frequency command $\omega rc$. And the signal of the absolute value in the absolute value circuit section 10 is input to the clamping circuit section 11, and the signal showing the code is input to the integration circuit section 13.

Furthermore, the clamping circuit 11 which is another element in said component clamps the absolute value signal from said absolute value circuit section 10 to the preset level value, and outputs the velocity change width $\Delta\omega r$ to the velocity change width setting section 12. When the magnitude of the absolute value signal from the absolute value circuit section 10 is higher than the clamped level, the velocity change width $\Delta\omega r$ becomes a value on the clamped level. On the other hand, when the magnitude of the absolute value signal is lower than the clamped level, the velocity change width $\Delta\omega r$ becomes a value of the absolute value signal.

And the signal processing in the clamping circuit section 11 is carried out for every optional constant cycle to output the velocity change width $\Delta\omega r$ for every interval of said constant cycle. Thereby, the output interval of the absolute value circuit section 10 of which input is a difference between the velocity command $\omega r$ and the excitation frequency command $\omega rc$ (=($\omega r - \omega rc$)), and the output interval of the output $\Delta\omega r$ of the clamping circuit section 11 become constant cycles, and the magnitude of the value represents the velocity change width which is accelerated or decelerated toward the velocity command.

Therefore, the velocity change width $\Delta\omega r$ from this clamping circuit section 11 represents a time constant of the excitation frequency command for carrying out the acceleration/deceleration of the induction motor, and the absolute value circuit section 10 and the clamping circuit section 11 can be handled as a kind of time constant circuit.

Namely, when the velocity change width $\Delta\omega r$ is large, it shows that the velocity change width for carrying out the acceleration/deceleration toward the velocity command $\omega r$ is large. On the contrary, the velocity change width $\Delta\omega r$ small, it shows that the velocity change width for carrying out the acceleration/deceleration toward the velocity command $\omega r$ is small.

To the input end of the velocity change width setting section 12, the velocity change width $\Delta\omega r$ set at the clamping circuit section 11 is input, and from the output end thereof, the set velocity change width $\Delta\omega rq$ corresponding to the torque component current value Iq can be obtained. The velocity change width setting section 12 has a torque characteristic of the motor as shown in the relationship of the torque component current value Iq on the abscissa and the set velocity change width $\Delta\omega rq$ on the ordinate, and outputs the set velocity change width $\Delta\omega rq$ in response to the torque component current value Iq, making the velocity change width $\Delta\omega r$ from said clamping circuit section 11 as the upper limit. In addition, the maximum value of said velocity change width $\Delta\omega rq$ can be set based on the maximum acceleration of the motor. This maximum acceleration of the motor generally becomes the maximum acceleration in the motor body.

In the torque characteristic, for example in the characteristic shown in the velocity change width setting section 12 in the drawing, when the torque component current value Iq is large, that is, when the load current is large, the width $\Delta\omega rq$ that the motor can change its velocity within a certain time is small. On the other hand, when the torque component current value Iq is small, that is, when the load current is small, the width $\Delta\omega rq$ that the motor can change its velocity within a certain time is large. And, the upper limit of the maximum value of the set velocity change width $\Delta\omega rq$ of the motor is restricted by the velocity change width $\Delta\omega r$ set at the clamping circuit section 11 or by a preset velocity change width $\Delta\omega r$ (for example, the maximum acceleration of the motor).

The set velocity change width $\Delta\omega rq$ determined in the velocity change width setting section 12 is integrated in the integration circuit section 13 to obtain the excitation frequency command $\omega rc$.

Now, the velocity change width setting section 12 will be described with reference to FIG. 3 and FIG. 4. In the graph showing the relation of the velocity change width $\omega rq$ against the torque component current value Iq in FIG. 3, the velocity change width $\Delta\omega r$ is shown in the case of $\Delta\omega r1$ to $\Delta\omega r4$.

When the velocity change width $\Delta\omega r$ is input to the velocity change width setting section 12 from the clamping circuit section 11, the input velocity change width $\Delta\omega r$ determines the upper limit of the set velocity change width $\Delta\omega$rq. For example, when the velocity change width $\Delta\omega$r to be input is $\Delta\omega$r4, since the magnitude of $\Delta\omega$r4 is larger than the upper limit (shown in a folded solid line) of the torque characteristic of the motor, the upper limit of the set velocity change width $\Delta\omega$rq is set corresponding with the upper limit value of the torque characteristic of the motor. Also when the velocity change width $\Delta\omega$r is $\Delta\omega$r3, since the magnitude of $\Delta\omega$r3 corresponds with the upper limit (shown in a folded solid line) of the torque characteristic of the motor, the upper limit of the set velocity change width $\Delta\omega$rq is set corresponding with the upper limit value of the torque characteristic of the motor. Furthermore, when the velocity change width $\Delta\omega$r is $\Delta\omega$r2 or $\Delta\omega$r1, since the magnitude of $\Delta\omega$r2 or $\Delta\omega$r1 is smaller than the upper limit (shown in a folded solid line) of the torque characteristic of the motor, the upper limit of the set velocity change width $\Delta\omega$rq is restricted corresponding to the magnitude of the velocity change width $\Delta\omega$r2 or $\Delta\omega$r1, and set to its value.

Thus, the upper limit of the set velocity change width $\Delta\omega$rq is set by the velocity change width $\Delta\omega$r.

Next, the situation in the case where the set velocity change width $\Delta\omega$rq is determined against the torque component current value Iq by the torque characteristic which sets the upper limit of said set velocity change width $\Delta\omega$rq will be described with reference to FIG. 4. Incidentally, FIG. 4(a) shows the case where the velocity change width $\Delta\omega$r in FIG. 3 is $\Delta\omega$r4 or $\Delta\omega$r3, and FIG. 4(b) shows the case where the velocity change width $\Delta\omega$r in FIG. 3 is $\Delta\omega$r1.

Figure 4A:
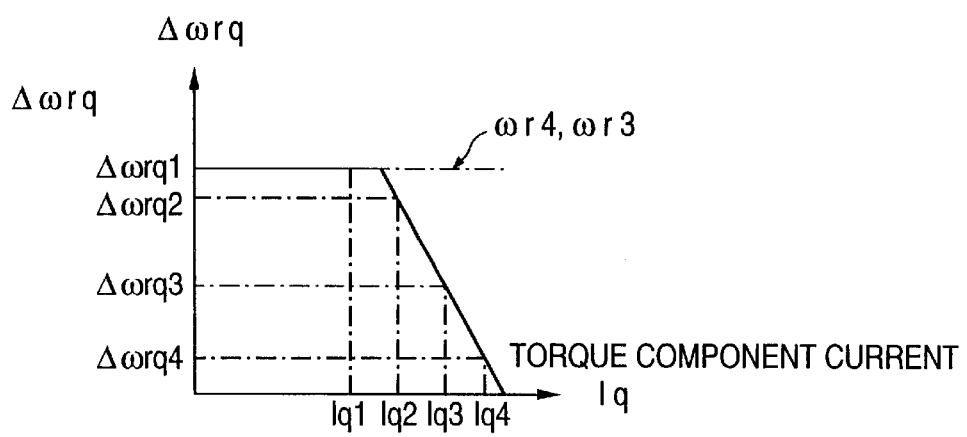
FIG. 4 is a view showing the set velocity change volume Δωrq against the torque component current value Iq of the present invention.

In FIG. 4(a), when the velocity change width $\Delta\omega$r is $\Delta\omega$r4 or $\Delta\omega$r3, the characteristic of the set velocity change width $\Delta\omega$rq against the torque component current value Iq corresponds with the torque characteristic of the motor. The example in FIG. 4 shows the case where the torque component current value Iq corresponding to the load current is large in the order of Iq1 to Iq4. The set velocity change width $\Delta\omega$rq1 corresponding to the torque component current value Iq1 is the upper limit shown by the horizontal line portion of the characteristic graph in the drawing, and the set velocity change width $\Delta\omega$rq2 to $\Delta\omega$rq4 corresponding to the torque component current value Iq2 to Iq4 becomes small in the order corresponding to the portion shown by the diagonal line in the characteristic graph.

Figure 4B:
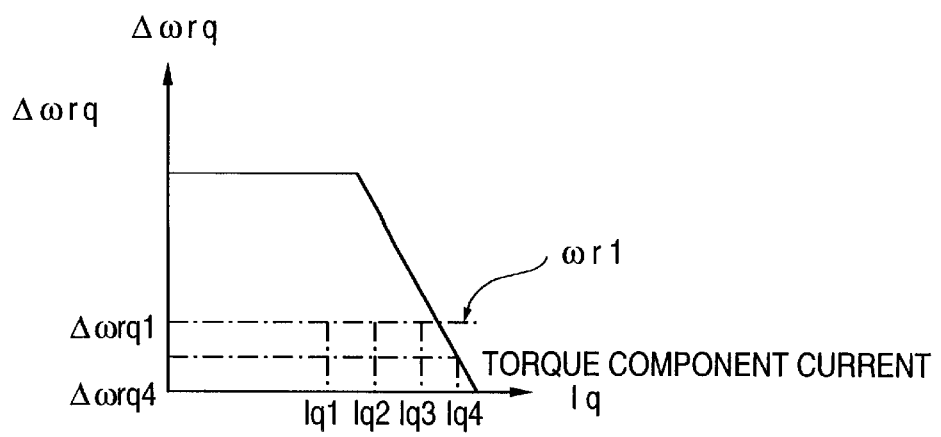

Furthermore in FIG. 4(b), when the velocity change width $\Delta\omega$r is $\Delta\omega$rq1, the characteristic of the set velocity change width $\Delta\omega$rq against the torque component current value Iq is restricted in its upper limit by the magnitude of the velocity change width $\Delta\omega$r1. The example in FIG. 4(b) shows the case where the torque component current value Iq corresponding to the load current becomes large in the order of Iq1 to Iq4. The set velocity change width $\Delta\omega$rq1 corresponding to the torque component current value Iq1 to Iq3 is the upper limit corresponding to the horizontal line portion of the characteristic graph (one-dot chain line) in the drawing, and the set velocity change width $\Delta\omega$rq4 corresponding to the torque component current value Iq4 is a value corresponding to the portion shown by the diagonal line in the characteristic graph in the drawing.

Figure 5A:
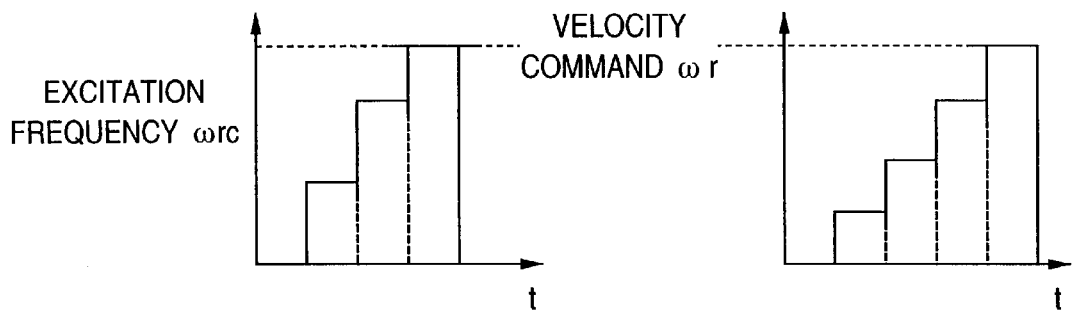
FIGS. 5(a) and 5(b) are views showing a signal in the acceleration/deceleration control section of the present invention.

Next, the change in the signals of said absolute value circuit section 10, the clamping circuit section 11, the velocity change width setting section 12, and the integration circuit section 13 will be described with reference to FIG. 5. FIG. 5(a) shows a case that ($\omega$r−$\omega$rc) is positive, and FIG. 5(b) shows a case that ($\omega$r−$\omega$rc) is negative.

Referring to FIG. 5, (a) shows the relation of the velocity command $\omega$r with the excitation frequency command $\omega$rc, (b) shows the difference between the velocity command $\omega$r and the excitation frequency command $\omega$rc (=($\omega$r−$\omega$rc)), (c) shows the output $\Delta\omega$r of the clamping circuit, (d) shows the set velocity change width $\Delta\omega$rq which is the output of the velocity change width setting section, and (e) shows the excitation frequency command $\omega$rc which is the output of the integration circuit section. And the left half (A) of FIG. 5 shows the case where the Iq is small, and the right half (B) of FIG. 5 shows the case were the Iq is large.

When the torque current line segment Iq is small, as shown in FIG. 5 (A), the upper limit of the output $\Delta\omega$r of the clamping circuit is restricted by the clamped value. And in the velocity change width setting section 12, since the torque current line segment Iq is small, the upper limit of the set velocity change width $\Delta\omega$rq is the clamped value, and $\Delta\omega$r which is restricted to below the clamped value is output directly as the set velocity change width $\Delta\omega$rq. The integration circuit section integrates said set velocity change width $\Delta\omega$rq to output the excitation frequency command arc.

Figure 5B:
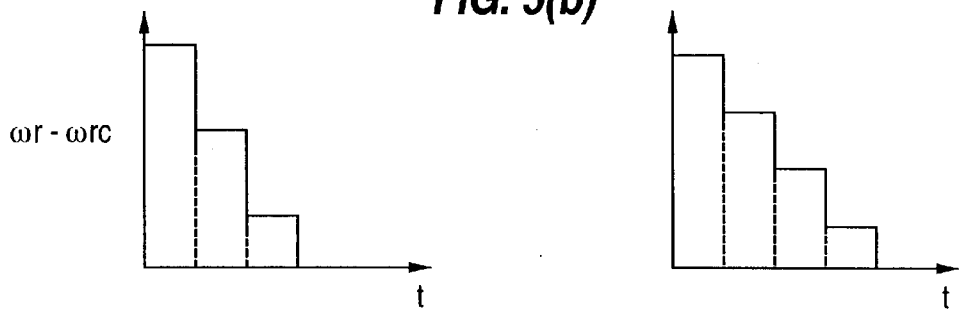
Figure 5C:
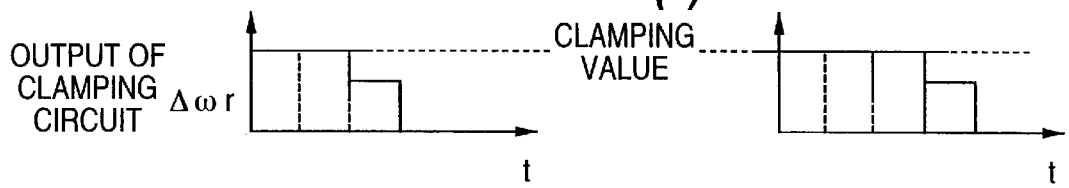
Figure 5D:
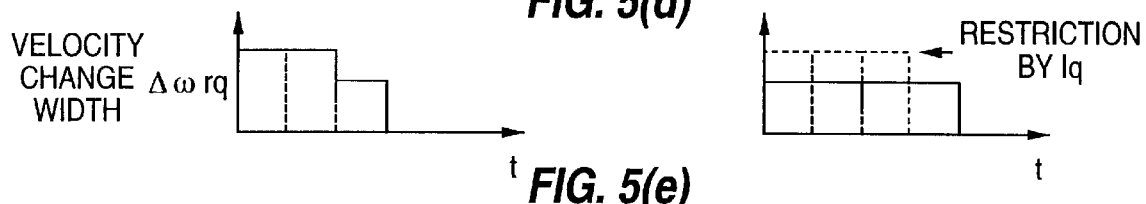
Figure 5E:
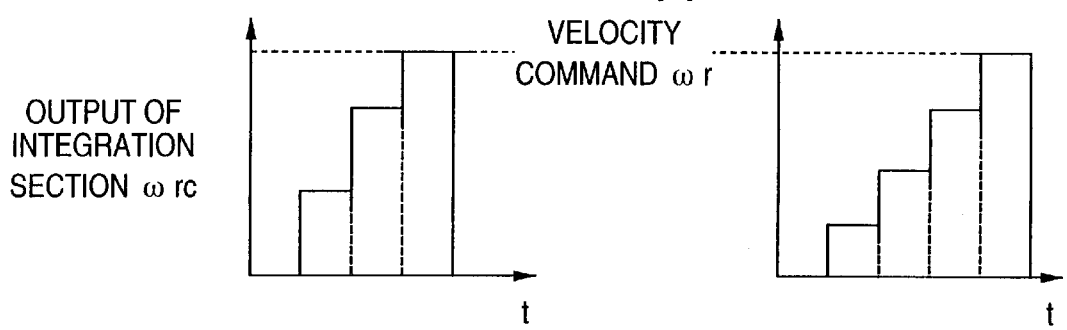
Figure 5F:
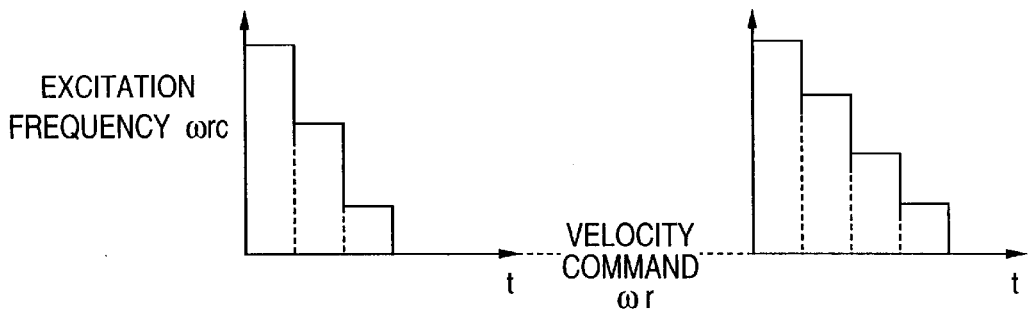
Figure 5G:
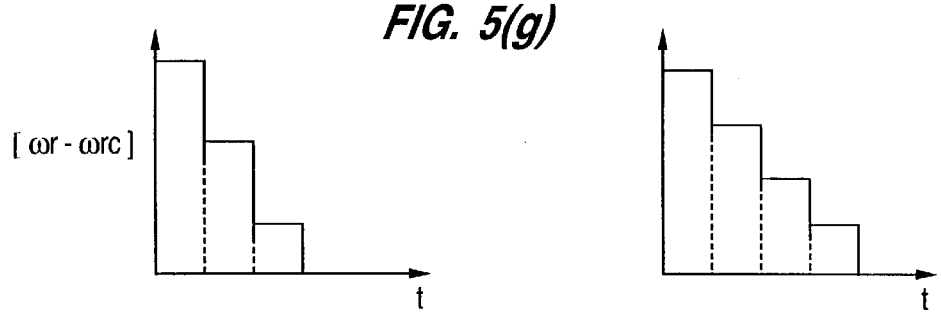
Figure 5H:
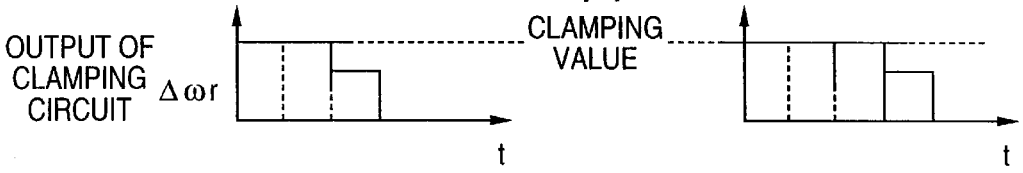
Figure 5I:
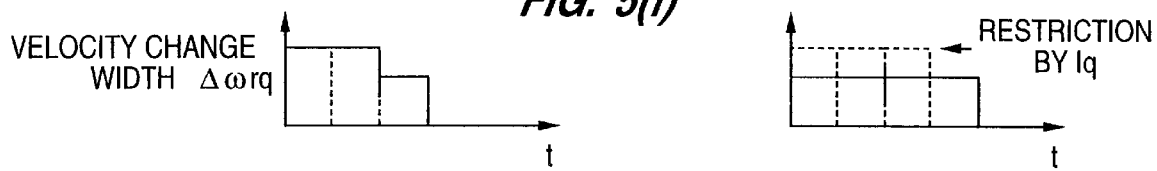
Figure 5J:
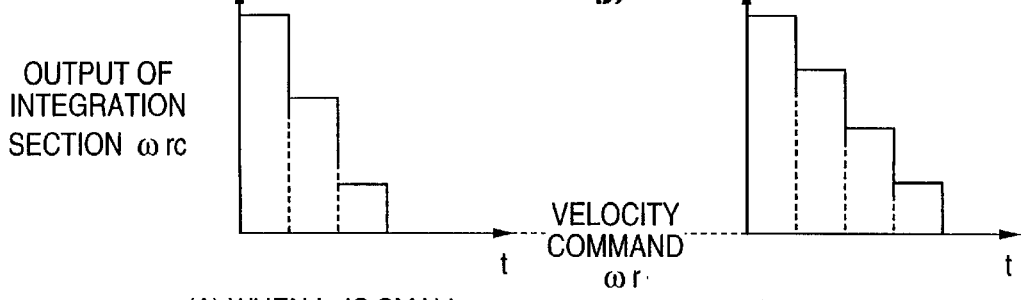

On the other hand, when the torque current line segment Iq is large, as shown in FIG. 5(b), the upper limit of the output $\Delta\omega$r of the clamping circuit is restricted by the clamped value. And in the velocity change width setting section 12, since the torque current line segment Iq is large, the set velocity change width $\Delta\omega$rq is the diagonal line portion of the characteristic graph and the value restricted by the characteristic in said diagonal line is output. The integration circuit section integrates this set velocity change width $\Delta\omega$rq to output the excitation frequency command $\omega$rc.

(Torque component current calculation section)

The torque component current calculation section 5 will now be described. The torque component current calculation section 5 is a section having a function to determine the torque component current value Iq by using the primary current of at least two phases among the three-phase currents on the primary side of the motor 4. The three-phase currents on the primary side of the motor 4 corresponds to the fixed axis u, v and w. In the two axes (d-q axes) which are orthogonal and rotates at the primary frequency against the fixed axes, the d-axis component is the excitation current component, and the q-axis component expresses the torque current component. Furthermore, in general, the transformation of the rotating coordinate to the orthogonal stationary coordinate can be conducted using the d-q transformation.

Therefore, in the torque component current calculation section 5, the three-phase currents on the primary side of the motor 4 are d-q transformed, and the q-axis component is determined as the torque current component.

Here, assuming that the three-phase currents on the primary side of the motor are Iu, Iv and Iw, respectively, and the phase of the d-axis against the u-axis is $\theta$, the current Id of the excitation current component and the current Iq of the torque current component can be expressed in the following equation:

$$Id = Iu \cdot \cos\theta + Iv \cdot \cos(\theta - 120°) + Iw \cdot \cos(\theta - 240°) \quad (1),$$

$$Iq = -Iu \cdot \sin\theta - Iv \cdot \sin(\theta - 120°) - Iw\theta \cdot \sin(\theta - 240°) \quad (2).$$

In addition, since the current of either one phase among Iu, Iv and Iw can be expressed by using the other two phase currents, in the torque component current calculation section 5, the torque component current value Iq can be determined by making the primary current of at least two phases among the three phase currents on the primary side of the motor 4 as the input signal.

In addition, the excitation phase $\theta$ in the calculation of the excitation current component current Id and the torque current component current Iq in the above equations (1) and (2) can be obtained the output of the integration calculation section 6. The integration calculation section 6 is a calculation section to integrate the excitation frequency command ωrc to determine the excitation phase θ.

The torque current component current Iq in the above equation (2) obtained in the torque component current calculation section 5 can be determined by, for example, storing said calculation equation in a memory means, reading out said calculation equation to CPU, and carrying out the calculation by the input primary current (for example, Iu and Iv shown in FIG. 1).

(Voltage command calculation section)

Figure 6:
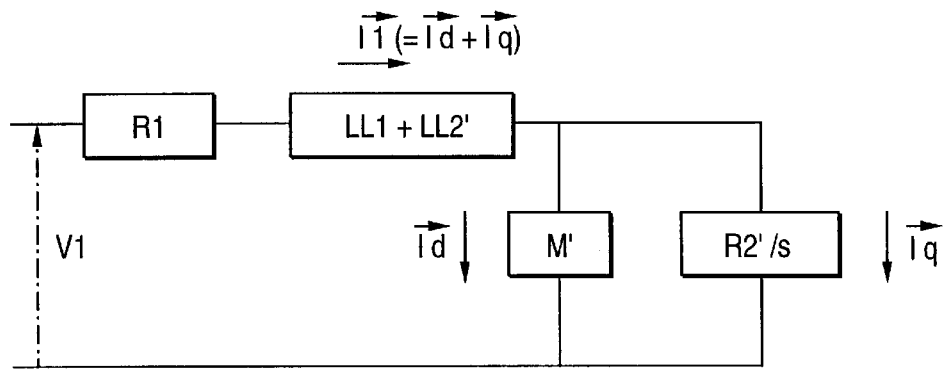
FIG. 6 is an equivalent circuit diagram of the induction motor.
Figure 7:
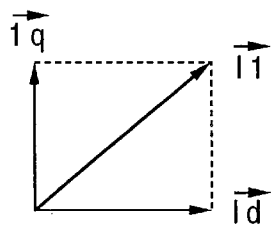
FIG. 7 is a view showing the current phasor.
Figure 8A:
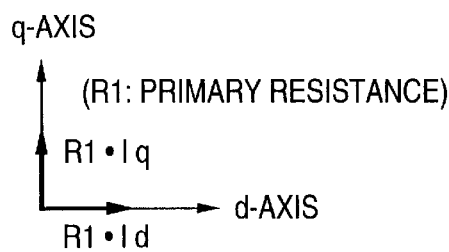
FIG. 8 is a view showing the voltage phasor on the equivalent circuit of the induction motor.
Figure 8B:
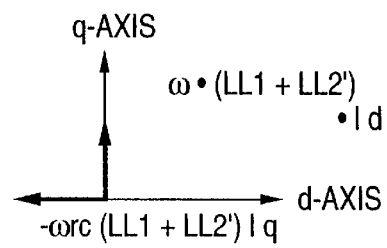
Figure 8C:
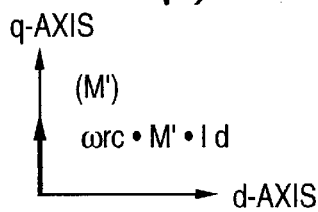
Figure 8D:
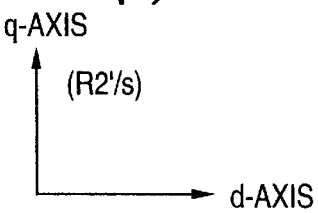
Figure 9:
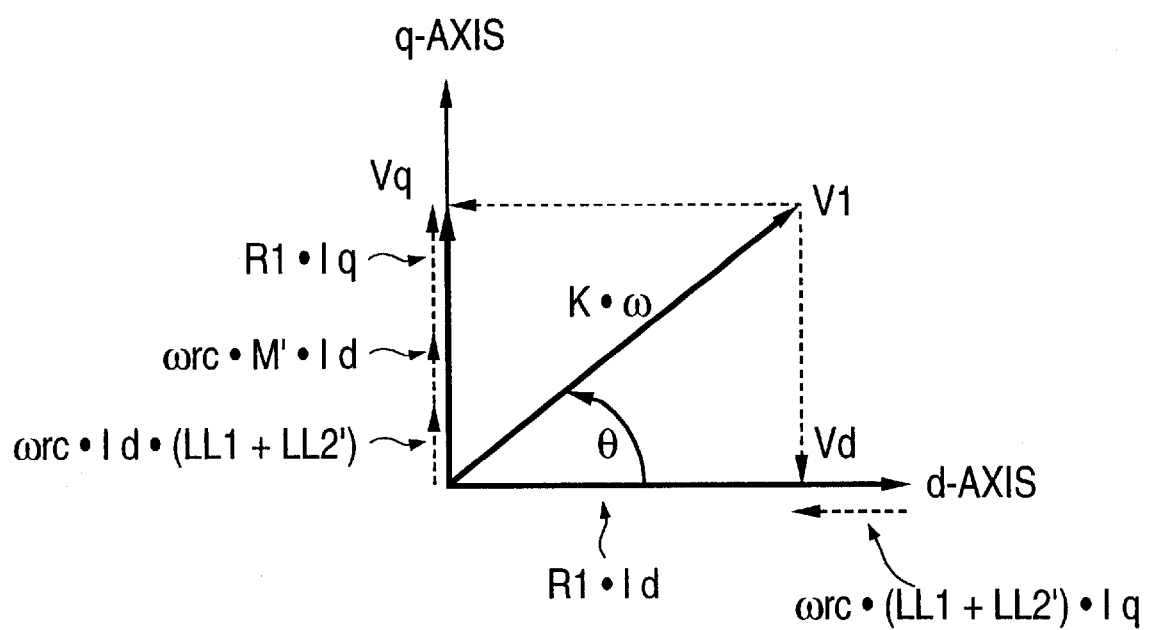
FIG. 9 is a view showing the voltage phasor on the equivalent circuit of the induction motor.

The voltage command calculation section will now be described with reference to the equivalent circuit of the induction motor of FIG. 6, the view of FIG. 7 showing the current phasor, and the views of FIGS. 8 and 9 showing the voltage phasor on the equivalent circuit of the induction motor.

The voltage command calculation section 3 is a calculation section having a function to input the excitation frequency command ωrc obtained from the acceleration/deceleration control section 1 and the excitation current command Id obtained from the excitation current calculation section 2 and determine the three phase voltages Vu, Vv and Vw to be supplied to the primary side of the motor 4.

When the equivalent circuit of the induction motor is expressed so that the inductance on the secondary side becomes 0, FIG. 6 will appear, where R1 is a primary resistance, R2 is a secondary resistance, L1 is a primary inductance, L2 is a secondary inductance, LL1 is a primary leakage inductance, LL2 is a secondary leakage inductance, M is a mutual inductance, and s is a slip, and furthermore $M'=M^2/L2$, $R2'=(M/L2)^2 \cdot R2$, and $LL2'=M \cdot LL2/L2$.

And, in the equivalent circuit, the R1 and (LL1+LL2') components are connected in series, and the current I1 flows therebetween. In addition, the current I1 is a vector sum of the excitation current component current Id and the torque current component current Iq, as shown in FIG. 7. And, M' component and R2' component are in parallel and are connected to said R1 and (LL1+LL2') components in series. And, the excitation current component current Id flows to the M' component, and the torque current component current Iq flows to the R2'/s component.

The d-axis component and the q-axis component of the voltage command in each component on the equivalent circuit will now be described with reference to FIG. 8. FIG. 8(*a*) represents a voltage command component in R1, and d-axis component is (R1·Id) and q-axis component is (R1·Iq). FIG. 8(*b*) represents a voltage command component in (LL1+LL2'), and d-axis component is –ωrc·(LL1+LL2')·Iq and q-axis component is ωrc·(LL1+LL2')·Id. FIG. 8(*c*) represents a voltage command component in (M') component, and d-axis component is 0 and q-axis component is (ωr·M'·Id) component. Furthermore, FIG. 8(*d*) represents a voltage command component in (R2'/s) component, and d-axis component and q-axis components are 0.

If these respective voltage command components are synthesized, the voltage command shown in a broken line in FIG. 9 will appear, and if the voltage command of d-axis component is assumed to be Vd, and the voltage command of q-axis component to is assumed to be Vq, they are expressed by the following equations:

$$Vd = R1 \cdot Id - \omega rc \cdot (LL1 + LL2') \cdot Iq \quad (3),$$

$$Vq = R1 \cdot Iq + \omega rc \cdot (LL1 + LL2' + M')Id \quad (4).$$

In the above equations, the term of Iq is to introduce the voltage change of the motor to the acceleration/deceleration control of the induction motor of the present invention to carry out the voltage correction by the velocity change of the motor, by inputting the torque component current value Iq to the voltage command calculation section 3.

When said orthogonal two-phase voltage commands are transformed into the three-phase voltage commands to be supplied to the motor 4, they are expressed by the following equations (5), (6) and (7):

$$Vu = Vd \cdot \cos\theta - Vq \cdot \sin\theta \quad (5),$$

$$Vv = Vd \cdot \cos(\theta - 120°) - Vq \cdot \sin(\theta - 120°) \quad (6),$$

$$Vw = Vd \cdot \cos(\theta - 240°) - Vq \cdot \sin(\theta - 240°) \quad (7).$$

The transformation of the above equations (5), (6) and (7) can use a value obtained by integrating the excitation frequency command ωrc in the integration calculation section 6 as the excitation phase θ.

Therefore, the three-phase voltage commands Vu, Vv and Vw are determined by transforming the voltage command Vd of d-axis component and the voltage command Vq of q-axis component obtained by the equations (3) and (4) by introducing the torque current component current Iq, using the above equations (5), (6) and (7), and the determined three-phase voltage commands Vu, Vv and Vw are supplied to the motor 4. Thereby, the adjustment of the excitation frequency in response to the change of the load inertia as well as the voltage correction by the velocity change of the motor are made possible in the acceleration/deceleration control of the induction motor.

Furthermore, if the voltage command on the d-q coordinate systems which are the orthogonal stationary coordinate systems is expressed by V1, the magnitude of this voltage command V1 is proportional to the velocity command ω, and can be expressed by Kω assuming that the proportional constant is to be K. Therefore, the d-axis component Vd and the q-axis component Vdq of the voltage commands can be expressed by the following equations (8) and (9), respectively:

$$Vd = V1 \cdot \cos\theta = K\omega \cdot \cos\theta \quad (8),$$

$$Vq = V1 \cdot \sin\theta = K\omega \cdot \sin\theta \quad (9).$$

And, the voltage commands obtained by the above equations (8) and (9) are transformed to the three-phase voltage commands by the above transformation equation (5) to (7), and the acceleration/deceleration control by the excitation frequency adjustment may be conducted in response to the change of the load inertia of the induction motor.

EXAMPLE 2 OF THE PRESENT INVENTION

Next, the structure of Example 2 in the acceleration/deceleration control of the induction motor of the present invention will be described with reference to the block diagram of FIG. 10.

Figure 10:
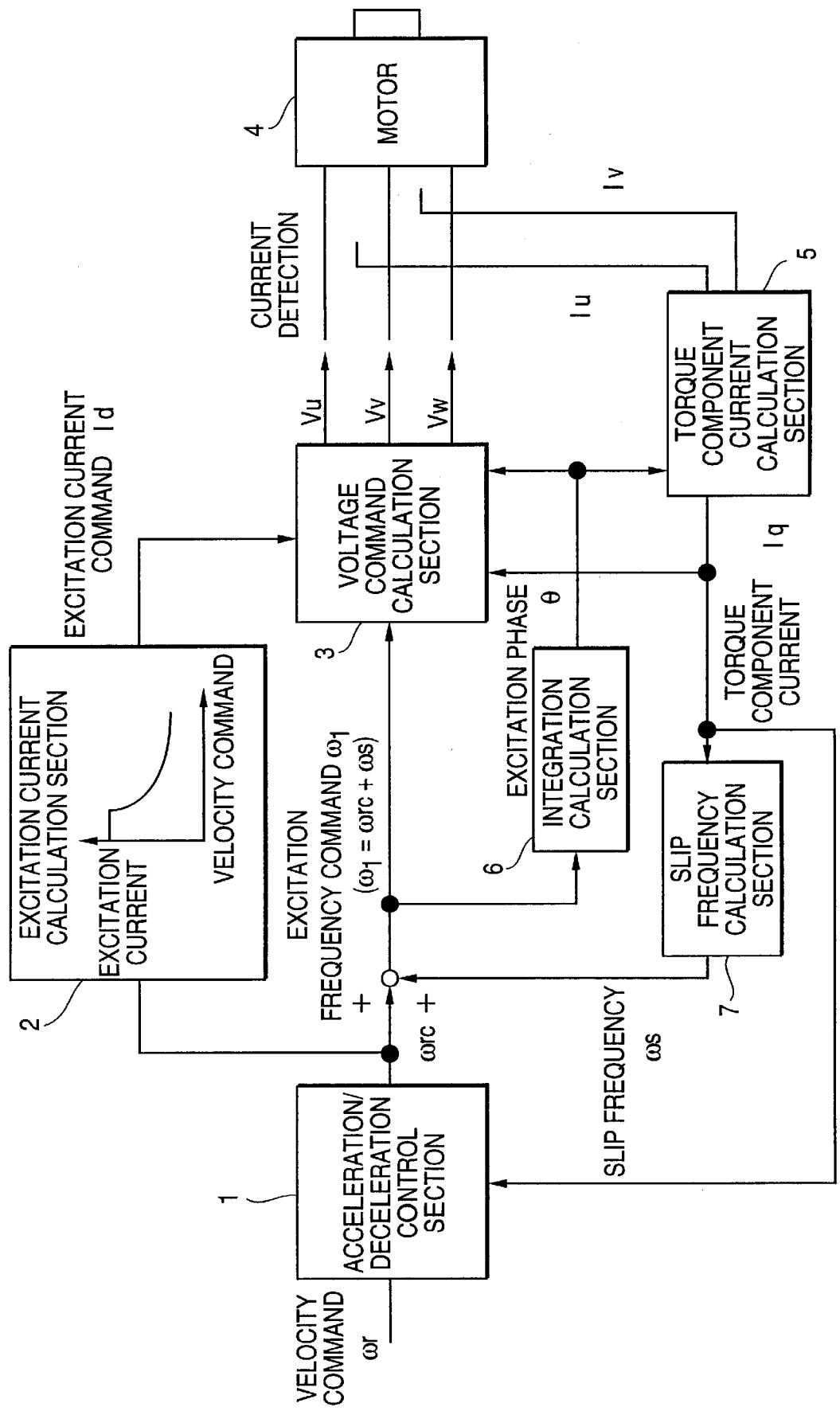
FIG. 10 is a block diagram illustrating the structure of Example 2 in the acceleration/deceleration control of the induction motor of the present invention.
Figure 11:
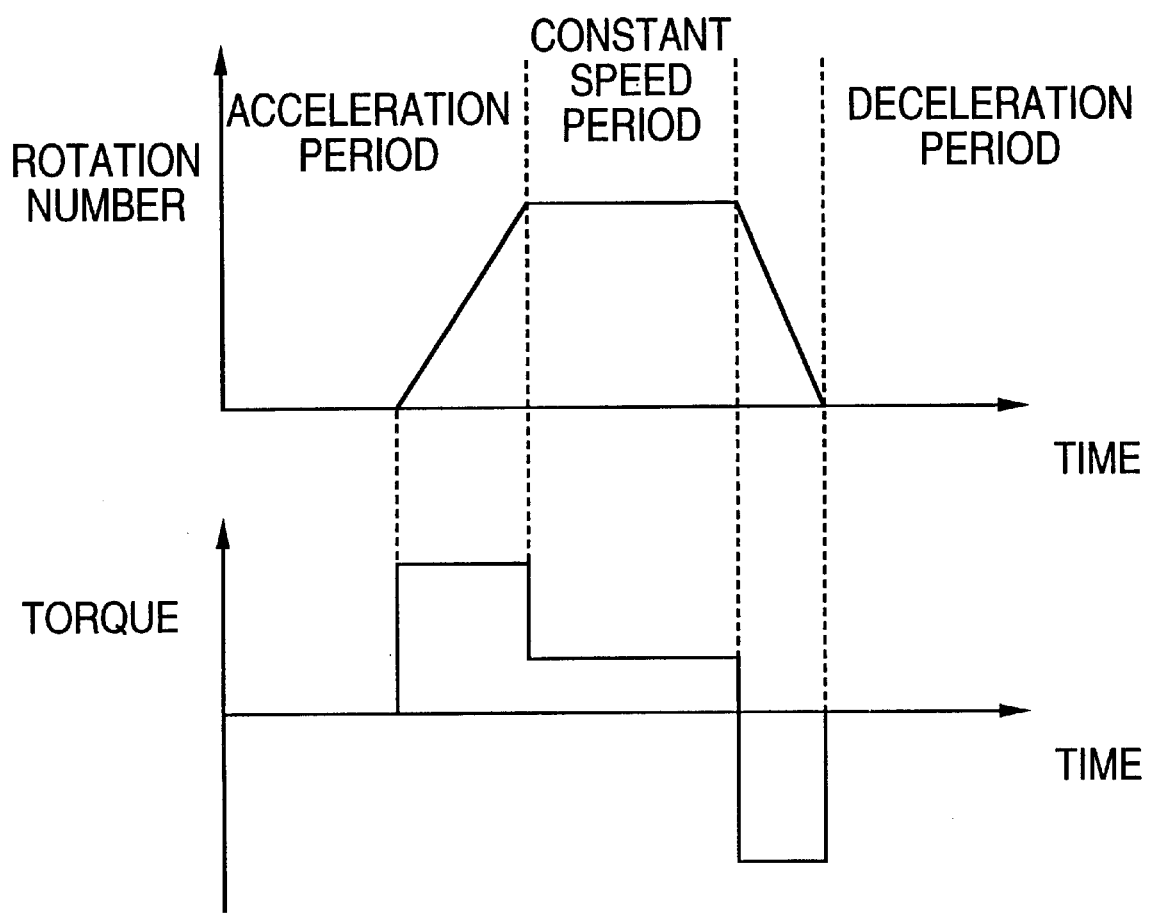
FIG. 11 is a view showing the acceleration/deceleration time of the inverter.

The structure of Example 2 of the present invention shown in FIG. 10 is substantially the same as that of the above-mentioned Example 1 shown in FIG. 1, except that the velocity change of the motor is corrected by a slip frequency calculation section 7. Therefore, the part of the slip frequency calculation section 7 which is different from Example 1 will be mainly described in the following description, and the description of the remaining part will be omitted.

The slip frequency calculation section 7 is to make the torque component current value Iq an input, and the slip frequency ωs an output, and one end thereof is connected to an output end of the torque component current calculation section 5, and the other end is connected to the adding point with the excitation frequency command ωrc from the acceleration/deceleration control section 1. And at said adding point, the addition of the excitation frequency command ωrc and the slip frequency ωs is conducted to obtain the excitation frequency command ω1 (=ωrc+ωs), which is input to the voltage command calculation section 3 as in the case of the excitation frequency command ωrc of the above Example 1.

The acceleration/deceleration control of the induction motor of the present invention is to determine the torque component current value by using the current value on the primary side of the induction motor, instead of directly determining the load current of the induction motor, and to estimate the load current of the induction motor by this torque component current value, whereby the excitation frequency control is conducted in response to the load. And, in order to perform said control, the induction motor of the present invention comprises, as the main component, an acceleration/deceleration control section 1 for controlling the velocity command ωr by inputting the torque component current value Iq, and a torque component current calculation section 5 for determining the torque component current value Iq, and further includes a voltage command calculation section 3 to which the torque component current is input, in order to conduct the voltage correction by the velocity change of the motor by introducing the voltage change of the motor to the acceleration/deceleration control of the induction motor.

Therefore, this Example 2 has, in addition to the above structure, a structure that the slip frequency calculation section 7 is added, whereby the velocity correction by the velocity change of the motor is performed by introducing the velocity change of the motor to the acceleration/deceleration control of the induction motor of the present invention.

The slip frequency calculation section 7 will now be described.

(Slip frequency calculation section)

In the induction motor, during the rotation of the motor, the rotating magnetic field rotates ahead of the rotor, and in the secondary winding, the magnetic flux is changed at a rate of the difference. The frequency of the alternating current which appears on the secondary side becomes (excitation frequency command ωrc–number of revolution ω). If the void magnetic flux at that time is assumed to be Φ2, the voltage of (excitation frequency command ωrc–number of revolution ω)·Φ2 is generated on the secondary side. On the other hand, if it is assumed that the resistance on the secondary side is to be R2, and the current i2 flows in said resistance, the voltage R2·i2 will be generated on this resistance. Therefore, the circuit equation on the secondary side determined by the above relationship will become the following equation (10):

$$R2 \cdot i2 - (\omega rc - \omega) \cdot \Phi2 = 0 \quad (10).$$

Here, assuming that (excitation frequency command ωrc–number of revolution ω) is as the slip frequency ωs, if the slip frequency ωs is solved by the above equation (10), it will become as follows:

$$\omega s = R2 \cdot i2/\Phi2 = (R2/\Phi2) \cdot i2 \quad (11),$$

and if R2/Φ2 is assumed to be a fixed number k, it will become as follows:

$$\omega s = k \cdot i2 \quad (12).$$

Here, the current i2 corresponds to the torque current component Iq which is the q-axis component on the orthogonal two axes (d-q axes) which rotate at the primary frequency, and the above equation (10) can be rewritten as:

$$\omega s = k \cdot Iq \quad (13),$$

and it can be said that the slip frequency ωs has a proportional relation with the torque current component Iq.

Therefore, in the slip frequency calculation section 7, the slip frequency ωs can be obtained by carrying out the calculation of the above equation (13) to the torque component current value Iq.

The slip frequency ωs is added to the excitation frequency command ωrc from the acceleration/deceleration control section 1 at the adding point to obtain a new excitation frequency command ω1 (=(ωrc+ωs)). Since this slip frequency ωs is (excitation frequency command ωrc–number of revolution ω), and is changed in response to the number of revolution ω, the excitation frequency command ω1 becomes the command value corrected depending on the change of the rotation number of the motor.

The voltage command calculation section 3 forms a voltage command by this excitation frequency command ω1 to drive the motor.

Therefore, in Example 2 as in the previous Example 1, the acceleration/deceleration control by the excitation frequency adjustment in response to the change of the load inertia of the induction motor and the voltage correction by the velocity change of the motor are performed, while a correction corresponding to the velocity change of the motor may be carried out by the slip frequency calculation section.

As described above, according to the present invention, the acceleration/deceleration control of the induction motor which can perform an adjustment of the excitation frequency in response to the change of the load inertia can be provided.

What is claimed is:

1. An acceleration and deceleration control method for a primary frequency control of an induction motor which changes a supply frequency of the induction motor to control a velocity of the induction motor based on a load of said induction motor, comprising the steps of:

determining a torque component current value based on a current value on a primary side of the induction motor, said torque component current value being substantially equal to a load current value of said induction motor;

inputting a velocity command value;

determining an excitation frequency command depending on change of load inertia in response to the torque component current value by changing the velocity command value by said torque component current value, thereby to determine said excitation frequency command depending on change of load inertia in response to said load current value of said induction motor;

controlling an acceleration and a deceleration of said induction motor based on said load current value of said induction motor by changing the supply frequency of said induction motor based on said excitation frequency command depending on change of load inertia; and determining an upper limit value of a velocity change value corresponding to said torque component value using both a torque characteristic of the motor and a velocity change value that is a difference between the velocity command and the excitation frequency command, wherein said upper limit value of velocity change value is integrated to obtain the excitation frequency command.

2. An acceleration and deceleration control method for a primary frequency control of an induction motor which changes a supply frequency of the induction motor to control a velocity of the induction motor based on a load of said induction motor, comprising the steps of:

determining a torque component current value based on a current value on a primary side of the induction motor, said torque component current value being substantially equal to a load current value of said induction motor;

inputting a velocity command value;

determining an excitation frequency command in response to the torque component current value by changing the velocity command value by said torque component current value, thereby to determine said excitation frequency command in response to said load current value of said induction motor;

determining an excitation current command based on said excitation frequency command;

determining a voltage command based on the excitation frequency command, the excitation current command, and the torque component current value; and controlling an acceleration and a deceleration of said induction motor based on said load current value of said induction motor by changing the supply frequency of said induction motor based on said excitation frequency command and by supplying said voltage command to the primary side of the induction motor; and determining an upper limit value of a velocity change value corresponding to said torque component value using both a torque characteristic of the motor and a velocity change value that is a difference between the velocity command and the excitation frequency command, wherein said upper limit value of velocity change value is integrated to obtain the excitation frequency command.

3. The acceleration and deceleration control method according to claim 1, wherein said torque component current value is a q-axis component obtained by a d-q transformation of at least two phase excitation currents among three phase excitation currents supplied to the primary side of the induction motor.

4. The acceleration and deceleration control method according to claim 1, wherein said excitation frequency command determination step further includes the steps of determining a velocity change width in response to the torque component current value from a relation of a torque current component value to said velocity change width based on a set of characteristics of the induction motor and by integrating the velocity change width.

5. The acceleration and deceleration control method according to claim 1, further comprising the steps of determining a slip frequency from said torque component current value, and adding the slip frequency to the excitation frequency command to obtain a new excitation frequency command.

6. An acceleration and deceleration control device for a primary frequency control of an induction motor which changes a supply frequency of the induction motor to control a velocity of the induction motor based on a load of said induction motor, comprising:

a torque component current calculation circuit which determines a torque component current value based on a current value on a primary side of the induction motor, said torque component current value being substantially equal to a load current value of said induction motor; and an acceleration and deceleration control circuit which determines an excitation frequency command depending on change of load inertia in response to the torque component current value by changing an inputted velocity command value based on said torque component current value, thereby to determine said excitation frequency command depending on change of load inertia in response to said load current value of said induction motor, and which controls an acceleration and a deceleration of said induction motor based on said load current value of said induction motor by changing the supply frequency of said induction motor based on said excitation frequency command depending on change of load inertia; and determining an upper limit value of a velocity change value corresponding to said torque component value using both a torque characteristic of the motor and a velocity change value that is a difference between the velocity command and the excitation frequency command, wherein said upper limit value of velocity change value is integrated to obtain the excitation frequency command.

7. The acceleration and deceleration control device according to claim 6, wherein said acceleration and deceleration control circuit is connected to an excitation current calculation circuit which outputs an excitation current command in response to the excitation frequency command, and said acceleration and deceleration control circuit is connected to a voltage command calculation section which inputs the excitation current command, the excitation frequency command and the torque component current value and generates therefrom three phase voltages to the primary side of the induction motor to thereby control said acceleration and deceleration of said induction motor.

8. The acceleration and deceleration control device according to claim 6, wherein the torque component current calculation circuit performs a d-q transformation by inputting at least two phase excitation currents among three phase excitation currents supplied to the primary side of the induction motor.

9. The acceleration and deceleration control device according to claim 6, wherein the acceleration and deceleration control circuit determines a velocity change width in response to the torque component current value from a relation of a torque current component value to said velocity change width based on a set of characteristics of the induction motor, and outputs the excitation frequency command by integrating said velocity change width.

10. The acceleration and deceleration control device according to claim 9, wherein a maximum value of said velocity change width is set in response to the velocity command value.

11. The acceleration and deceleration control device according to claim 9, wherein a maximum value of said velocity change width is a preset value.

12. The acceleration and deceleration control device according to claim 6, further including a slip frequency calculation circuit which corrects a velocity change of the induction motor by determining a slip frequency from the torque component current value and adding the slip frequency to said excitation frequency command to obtain a new excitation frequency command.

* * * * *